United States Patent
Satoya

(10) Patent No.: US 7,139,658 B2
(45) Date of Patent: Nov. 21, 2006

(54) APPARATUS DETECTING ABNORMALITY OF EXHAUST SYSTEM OF INTERNAL COMBUSTION ENGINE

(75) Inventor: Koichi Satoya, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/954,114

(22) Filed: Sep. 30, 2004

(65) Prior Publication Data
US 2005/0102094 A1 May 12, 2005

(30) Foreign Application Priority Data
Nov. 10, 2003 (JP) ............................. 2003-379935

(51) Int. Cl.
*G01M 15/05* (2006.01)
(52) U.S. Cl. .................... 701/114; 60/276; 73/118.1
(58) Field of Classification Search ............... None
See application file for complete search history.

(56) References Cited

U.S. PATENT DOCUMENTS

| | | |
|---|---|---|
| 5,542,248 A | 8/1996 | Iwata et al. |
| 6,922,985 B1 * | 8/2005 | Wang et al. ................ 60/277 |
| 2003/0131587 A1 | 7/2003 | Kawamura |
| 2003/0154709 A1 * | 8/2003 | Kadowaki et al. .......... 60/276 |

FOREIGN PATENT DOCUMENTS

| | | |
|---|---|---|
| JP | A 05-163984 | 6/1993 |
| JP | A 07-139401 | 5/1995 |
| JP | A 10-047130 | 2/1998 |
| JP | A 2003-206805 | 7/2003 |

OTHER PUBLICATIONS

Japan Institute of Invention and Innovation Technical Report No. 2003-501895, published Apr. 18, 2003.
Japan Institute of Invention and Innovation Technical Report No. 2003-501899, published Apr. 18, 2003.

* cited by examiner

*Primary Examiner*—Andrew M. Dolinar
(74) *Attorney, Agent, or Firm*—Oliff & Berridge, PLC

(57) ABSTRACT

An engine ECU executes a program including the steps of: detecting an air intake; subtracting an air fuel ratio detected by an upstream air fuel ratio sensor from that detected by a downstream air fuel ratio sensor; using the calculated air fuel ratio difference to determine a range for a lower GA range; determining a range for a higher GA range; and determining from the combination of the determined ranges of the lower and higher GA ranges whether a section A's exhaust system operates normally or has abnormality.

24 Claims, 7 Drawing Sheets

FIG. 4

| | AF(B) −AF(A) | | | |
|---|---|---|---|---|
| LOWER GA | RANGE X | RANGE X | RANGE Z | RANGE Z |
| HIGHER GA | RANGE X | RANGE Y | RANGE X | RANGE Y |
| DECISION FOR SECTION A | NO LEAK | AF(A) OR AF(B) SENSOR HAS ABNORMALITY | LEAK OBSERVED | AF(A) OR AF(B) SENSOR HAS ABNORMALITY |

FIG. 5

| | AF(C) −AF(B) | | | |
|---|---|---|---|---|
| LOWER GA | RANGE X | RANGE X | RANGE Z | RANGE Z |
| HIGHER GA | RANGE X | RANGE Y | RANGE X | RANGE Y |
| DECISION FOR SECTION B | NO LEAK | AF(B) OR AF(C) SENSOR HAS ABNORMALITY | LEAK OBSERVED | AF(B) OR AF(C) SENSOR HAS ABNORMALITY |

F I G. 7

| |AF(A)−AF(B)|≤β | ESTABLISHED (Y) | NOT ESTABLISHED (N) | ESTABLISHED (Y) | NOT ESTABLISHED (N) |
|---|---|---|---|---|
| |AF(A)−AF(C)|≤γ | ESTABLISHED (Y) | NOT ESTABLISHED (N) | ESTABLISHED (Y) | NOT ESTABLISHED (N) |
| |AF(B)−AF(C)|≤σ | ESTABLISHED (Y) | ESTABLISHED (Y) | NOT ESTABLISHED (N) | NOT ESTABLISHED (N) |
| RESULT OF DECISION | AF SENSORS (A), (B), (C) OPERATE NORMALLY | AF SENSOR (A) HAS ABNORMALITY | AF SENSOR (B) HAS ABNORMALITY | AF SENSOR (C) HAS ABNORMALITY |

APPARATUS DETECTING ABNORMALITY OF EXHAUST SYSTEM OF INTERNAL COMBUSTION ENGINE

This nonprovisional application is based on Japanese Patent Application No. 2003-379935 filed with the Japan Patent Office on Nov. 10, 2003, the entire contents of which are hereby incorporated by reference.

BACKGROUND OF THE INVENTION

1. Field of the Invention

The present invention relates generally to apparatuses detecting abnormality of internal combustions engines and particularly to those identifying abnormality of exhaust systems.

2. Description of the Background Art

For a vehicle's internal combustion engine an air intake system intakes air which is in turn mixed with a fuel provided from a fuel system and the air fuel mixture is combusted in a combustion chamber and an exhaust system exhausts gas. Accordingly the internal combustion engine's operation is controlled as based on detection signals issued from the air intake, fuel and exhaust systems, respectively.

For such an internal combustion engine the exhaust system is provided with an exhaust sensor outputting a signal which is used to provide a feedback learning value allowing an air fuel ratio (or air fuel mixture) to be controlled by feedback to be a theoretical air fuel ratio.

If the exhaust system or the like has trouble, however, the internal combustion engine's each system is unsatisfactorily controlled. Accordingly an internal combustion engine is equipped with an abnormality detection apparatus detecting abnormality of the internal combustion engine including an exhaust system. For example a technique employed to detect an internal combustion engine's abnormality, an exhaust system's gas leak and other similar abnormality is disclosed in the following documents:

Japanese Patent Laying-Open No. 10-47130 discloses an apparatus detecting abnormality of an internal combustion engine that accurately, separately identifies abnormality of an air intake system, that of an exhaust system and that of a fuel system. This apparatus, in an internal combustion engine including an exhaust system provided with an exhaust sensor outputting a signal used to provide a feedback learning value allowing an air fuel ratio to be controlled by feedback to be a theoretical air fuel ratio, includes an abnormality determiner. More specifically, a condition is established for diagnosis of abnormality of the internal combustion engine, a feedback learning value and a preset feedback learning value are compared, a feedback learning value varying with the internal combustion engine's condition of operation and preset feedback learning value are compared, and the internal combustion engine's abnormal portion is determined by the abnormality determiner. The internal combustion engine's abnormality portion can early be specified to prevent large amounts of exhaust gas released into the atmosphere and negatively affecting the environment.

Japanese Patent Laying-Open No. 2003-206805 discloses an engine's air fuel ratio control apparatus diagnosing with precision an exhaust gas leak introduced upstream of a catalyst. This apparatus includes air fuel ratio sensors arranged upstream and downstream, respectively, of the catalyst, a portion calculating a basic control constant for air fuel ratio feedback control, a portion determining whether it is a time at which a condition for the air fuel ratio feedback control is established, a portion driven by a decision that it is a time at which the condition is established to use the downstream air fuel ratio sensor's output to calculate a modified value for the basic control constant, a portion using the modified value to modify the basic control constant to calculate a control constant, a portion using the calculated control constant to control by feedback an air fuel ratio as based on the upstream air fuel ratio sensor's output, and a portion determining that exhaust gas is leaking when a difference between a modified value for a lower air intake range and that for a higher air intake range exceed a predetermined value.

If a decision that exhaust gas is leaking is made from a modified value for a single condition of operation exceeding a prescribed value, a base air fuel ratio with an offset associated with variation in production, degradation with time and the like contributes to reduced precision for decision. The disclosed engine air fuel ratio control apparatus can use modified value for two different operation ranges to determine whether an exhaust path upstream of the catalyst has exhaust gas leak. If the base air fuel ratio has an offset, the apparatus can determine exhaust gas leak with precision.

However, the apparatus disclosed in Japanese Patent Laying-Open No. 10-47130, comparing a learning feedback value and a set feedback value to detect abnormality, provides poor precision for detection and also consumes time for detection. This is because the feedback control employs a learning value used to eliminate effects of a variety of variations to determine abnormality and it is difficult to separate the variations and the occurrence of abnormality. As such, improved precision for determination of abnormality can hardly be achieved and to provide such an improved precision a severer condition for detection of abnormality is unavoidable. This results in limited occasion for detection of abnormality and if abnormality occurs it may not be detected.

Furthermore, the apparatus disclosed in Japanese Patent Laying-Open No. 2003-206805 employs a difference between a modified value for the lower air intake range and that for the higher air intake range to detect an exhaust gas leak introduced upstream of the catalyst. This modified value is a modified value for the basic control constant for air fuel ratio feedback control that is calculated from the downstream air fuel ratio sensor's output. In this regard, the apparatus can have a disadvantage similar to that of Japanese Patent Laying-Open No. 10-47130.

SUMMARY OF THE INVENTION

The present invention contemplates an apparatus detecting abnormality of an internal combustion engine that is capable of detecting abnormality of an exhaust system.

The present invention also contemplates an apparatus detecting abnormality of an internal combustion engine that is capable of detecting abnormality of an exhaust system with high precision.

The present invention also contemplates an apparatus detecting abnormality of an internal combustion engine that can use a value detected by an air fuel ratio sensor to detect abnormality of an exhaust system with high precision.

The present apparatus includes: a first air fuel ratio detector arranged at an exhaust pipe of the internal combustion engine closer to the internal combustion engine to detect an air fuel ratio of exhaust gas; a second air fuel ratio detector arranged at the exhaust pipe downstream of the first air fuel ratio detector to detect an air fuel ratio of exhaust gas; a detector detecting an air intake introduced into the internal combustion engine; a calculator calculating a difference between a value detected by the first air fuel ratio detector and that detected by the second air fuel ratio detector; and an abnormality detector using the air intake and the difference to detect abnormality of the exhaust pipe located between the first and second air fuel ratio detectors.

The exhaust pipe is provided with two air fuel ratio detectors. The calculator calculates a difference between values of air fuel ratios detected by the two air fuel ratio detectors. Herein an air fuel ratio is a ratio of air to fuel (air by mass/fuel by mass), and if the exhaust pipe between the two air fuel ratio detectors has a leak, air is intaken from outside the exhaust pipe into the pipe as the internal combustion engine pulses, resulting in increased air fuel ratio. In that case, an air fuel ratio detected by the second air fuel ratio detector arranged downstream (or closer to a muffler) is larger than that detected by the first air fuel ratio detector arranged upstream (or closer to the engine) and their difference, i.e., the air fuel ratio detected by the second air fuel ratio detector minus that detected by the first air fuel ratio detector has a positive value. If the first and second air fuel ratio detectors both operate normally and the exhaust pipe between the two air fuel ratio detectors does not have a leak then the difference (the air fuel ratio detected by the second air fuel ratio detector minus that detected by the first air fuel ratio detector) has a value extremely close to zero. In particular, if the exhaust pipe has a leak, the second air fuel ratio detector detects an air fuel ratio represented by {(an amount of air detected by the first air fuel ratio detector (correlated with air intake)+an amount of air intaken attributed to the leak)/an amount of fuel}, and if a constant amount of air is intaken from outside the exhaust pipe through the leaking portion irrespective of air intake's magnitude for the sake of illustration then the second air fuel ratio detector detects an air fuel ratio with a more remarkable error introduced for smaller air intake than larger air intake. Such an air intake difference can also be considered and an air fuel ratio difference (an air fuel ratio difference detected by the second air fuel ratio detector minus that detected by the first air fuel ratio detector) can be used to detect whether the exhaust pipe has abnormality (a leak). Thus using a difference between exact air fuel ratios allows abnormality of the exhaust pipe to be detected with high precision. Consequently an apparatus detecting abnormality of an internal combustion engine can be provided that can use a value detected by an air fuel ratio sensor corresponding to the air fuel ratio detector to detect abnormality of an exhaust system with high precision.

More preferably the abnormality detector detects a leak from the exhaust pipe between the first and second air fuel ratio detectors.

If the exhaust pipe between the two air fuel ratio detectors has a leak, air is intaken from outside the pipe into the pipe as the internal combustion engine pulses, resulting in increased air fuel ratio. In that case, an air fuel ratio detected by the second air fuel ratio detector arranged downstream (or closer to the muffler) is larger than that detected by the first air fuel ratio detector arranged upstream (or closer to the engine) and their difference (the air fuel ratio detected by the second air fuel ratio detector minus that detected by the first air fuel ratio detector) can be calculated and if the difference is larger than a predetermined positive value that between the first and second air fuel ratio detectors the exhaust pipe has a leak can be detected.

More preferably the calculator calculates the difference by subtracting a value detected by the first air fuel ratio detector from that detected by the second air fuel ratio detector.

If an air fuel ratio detected by the second air fuel ratio detector minus that detected by the first air fuel ratio detector is larger than the predetermined positive value that between the first and second air fuel ratio detectors the exhaust pipe has a leak can be detected.

More preferably, the abnormality detector detects that the exhaust pipe has a leak when for a range of the air intake having at most a predetermined amount of air the difference has a positive value larger than a predetermined value (hereinafter this condition will be referred to as falling within a range Z) and for a range of the air intake having an amount larger than the predetermined amount of air the difference has at most the predetermined value (hereinafter this condition will be referred to as falling within a range X), and the abnormality detector detects that the exhaust pipe does not have a leak when for the range of the air intake having at most the predetermined amount of air the difference has at most the predetermined value (or falls within range X) and for the range of the air intake having an amount larger than the predetermined amount of air the difference has at most the predetermined value (or falls within range X).

If the two air fuel ratio detectors both operate normally and there is also a leak then for smaller air intakes the second air fuel ratio detector detects larger air fuel ratios and the calculated differences also have larger values. As such when there is a leak and air intake is small then the difference falls within a range positive and large in value (or range Z). If there is a leak and air intake is larger the second air fuel ratio detector detects hardly increased air fuel ratio and the calculated difference also has a smaller value. As such when the two air fuel ratio detectors both operate normally, and there are also a leak and a large air intake, the difference falls within a range smaller in value (or range X). If there is no leak, then regardless of air intake's magnitude, the calculated difference falls within the range smaller in value (range X). Thus an air intake's magnitude and an air fuel ratio difference's magnitude can be combined and thus used to detect whether the exhaust pipe has abnormality (or a leak).

The present invention in another aspect provides an apparatus detecting abnormality of an internal combustion engine, including: a first air fuel ratio detector arranged at an exhaust pipe of the internal combustion engine closer to the internal combustion engine to detect an air fuel ratio of exhaust gas; a second air fuel ratio detector arranged at the exhaust pipe downstream of the first air fuel ratio detector to detect an air fuel ratio of exhaust gas; a detector detecting an air intake introduced into the internal combustion engine; a calculator calculating a difference between a value detected by the first air fuel ratio detector and that detected by the second air fuel ratio detector; and an abnormality detector using the air intake and the difference to detect abnormality of one of the first and second air fuel ratio detectors.

If the exhaust pipe between the two air fuel ratio detectors has a leak, air is intaken from outside the pipe into the pipe as the internal combustion engine pulses, resulting in increased air fuel ratio. In that case, an air fuel ratio detected by the second air fuel ratio detector arranged downstream (or closer to the muffler) is larger than that detected by the first air fuel ratio detector arranged upstream (or closer to the engine) (i.e., the air fuel ratio detected by the second air fuel ratio detector minus that detected by the first air fuel ratio detector provides a difference having a positive value). By contrast, if the exhaust pipe between the two air fuel ratio detectors does not have a leak then both an air fuel ratio detected by the first air fuel ratio detector and that detected by the second air fuel ratio detector are both close in value, i.e., their difference has a value extremely close to zero. Furthermore if the exhaust pipe has a leak, and air intake is smaller, the difference increases. However, if none of the patterns described above applies, e.g., for small air intake the difference has a value close to zero (it falls within range X and there is no difference when a leak's effect significantly appears, and it can be conjectured that there is no leak) and for large air intake the difference attains a large, positive value (hereinafter this condition will be referred to as falling within a range Y), it can be conjectured that there is no leak for a range corresponding to small air intake, whereas a large difference appears for a range that corresponds to large air intake and should not have a leak's effect appearing significantly. In such a case, a decision can be made that one or both of the two air fuel ratio detectors has/have abnormality (e.g., failure). As a result, an apparatus detecting abnormality of an internal combustion engine can be provided that can use a value detected by an air fuel ratio sensor corresponding to the air fuel ratio detector to detect abnormality of an exhaust system with high precision.

Preferably the calculator calculates the difference by subtracting a value detected by the first air fuel ratio detector from that detected by the second air fuel ratio detector.

An air fuel ratio difference (an air fuel ratio detected by the second air fuel ratio detector minus that detected by the first air fuel ratio detector) can be calculated and from a combination of the difference and an air intake whether the air fuel ratio detector have abnormality or not can be detected. More specifically, if for small air intake the difference is small (or falls within range X and it can be conjectured that there is no leak) and for increased air intake the difference is increased (or falls within range Y) or if for small air intake the difference is large (or falls within range Z and it can be conjectured that there is a leak) and for increased air intake the difference, which should be decreased, is still large (or falls within range Y) then a decision can be made that one or both of the air fuel ratio detectors has/have abnormality (e.g., failure).

More preferably the abnormality detector detects abnormality of one of the first and second air fuel ratio detectors when for a range of the air intake having at most a predetermined amount of air the difference has at most a predetermined value (or falls within range X) and for a range of the air intake having an amount larger than the predetermined amount of air the difference has a positive value larger than the predetermined value (or falls within range Y) or when for the range of the air intake having at most the predetermined amount of air the difference has a positive value larger than the predetermined value (or falls within range Z) and for the range of the air intake having an amount larger than the predetermined amount of air the difference has a positive value larger than the predetermined value (or falls within range Y).

If for small air intake the difference is small (or falls within range X and it can be conjectured that there is no leak) and for increased air intake the difference is increased (or falls within range Y and it can be conjectured that there is a significant leak) or if for small air intake the difference is large (or falls within range Z and it can be conjectured that there is a leak) and for increased air intake the difference, which should be decreased, is still large (or falls within range Y) then a decision can be made that one or both of the air fuel ratio detectors has/have abnormality (e.g., failure).

The present invention is still another aspect provides an apparatus detecting abnormality of an internal combustion engine, including: a first air fuel ratio detector arranged at an exhaust pipe of the internal combustion engine closer to the internal combustion engine to detect an air fuel ratio of exhaust gas; a second air fuel ratio detector arranged at the exhaust pipe downstream of the first air fuel ratio detector to detect an air fuel ratio of exhaust gas; a third air fuel ratio detector arranged at the exhaust pipe downstream of the second air fuel ratio detector to detect an air fuel ratio of exhaust gas; a calculator calculating a difference between values detected by the air fuel ratio detectors; and an abnormality detector using the difference and a predetermined threshold value to detect abnormality of the air fuel ratio detectors.

If it is assumed that the exhaust pipe does not have a leak then the first, second and third air fuel ratio detectors should detect substantially the same air fuel ratio. Accordingly, if any two of the three air fuel ratio detectors are selected to form three pairs thereof and the pairs' respective air fuel ratio differences are calculated in absolute value the three absolute values all have small value. However, if the first air fuel ratio detector has abnormality, the second and third air fuel ratio detectors' difference has a small absolute value, and the first and second air fuel ratio detectors' difference has a large absolute value and so does the first and third air fuel ratio detectors' difference. Thus from the three pairs' air fuel ratio differences an air fuel ratio detector having abnormality can be determined. Consequently an apparatus detecting abnormality of an internal combustion engine can be provided that can use a value detected by an air fuel ratio sensor corresponding to the air fuel ratio detector to detect abnormality of an exhaust system with high precision.

Preferably the calculator calculates a first value corresponding to an absolute value of a difference between values detected by the first and second air fuel ratio detectors, a second value corresponding to an absolute value of a difference between values detected by the first and third air fuel ratio detectors, and a third value corresponding to an absolute value of a difference between values detected by the second and third air fuel ratio detectors and the abnormality detector detects abnormality of the air fuel ratio detectors from a comparison between the first value and a first threshold value, a comparison between the second value and a second threshold value and a comparison between the third value and a third threshold value.

The calculator calculates a first value corresponding to an absolute value of a difference between values detected by the first and second air fuel ratio detectors, a second value corresponding to an absolute value of a difference between values detected by the first and third air fuel ratio detectors, and a third value corresponding to an absolute value of a difference between values detected by the second and third air fuel ratio detectors. The first value and a first threshold value are compared (as a first comparison). The second value and a second threshold value are compared (as a second comparison). The third value and a third threshold value are compared (as a third comparison). If the first, second and third comparisons are all smaller than threshold value the three air fuel ratio detectors all operate normally. If the first comparison does not indicate normality (or the difference's absolute value exceeds the first threshold value), the second comparison does not indicate normality (or the difference's absolute value exceeds the second threshold value) and the third comparison indicates normality (or the difference's absolute value does not exceed the third threshold value) then a decision can be made that the first air fuel ratio detector has abnormality. If the first comparison does not indicate normality (or the difference's absolute value exceeds the first threshold value), the second comparison indicates normality (or the difference's absolute value does not exceed the second threshold value) and the third comparison does not indicate normality (or the difference's absolute value exceeds the third threshold value) then a decision can be made that the second air fuel ratio detector has abnormality. If the first comparison indicates normality (or the difference's absolute value does not exceed the first threshold value), the second comparison does not indicate normality (or the difference's absolute value exceeds the second threshold value) and the third comparison does not indicate normality (or the difference's absolute value exceeds the third threshold value) then a decision can be made that the third air fuel ratio detector has abnormality.

Preferably the exhaust pipe between the air fuel ratio detectors is provided with a catalyst device.

An apparatus detecting abnormality of an internal combustion engine can be provided that can use air fuel ratios detected by air fuel ratio detectors arranged upstream and downstream of the catalyst device arranged intermediate of the exhaust pipe, and air intake to detect abnormality of an exhaust system with high precision.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4 and 5 are tables stored in the FIG. 1 engine ECU.

FIG. 7 is a table stored in an engine ECU of an abnormality detection system in accordance with a second embodiment of the present invention.

DESCRIPTION OF THE PREFERRED EMBODIMENTS

Hereinafter reference will be made to the drawings to describe embodiments of the present invention. In the following description, like components are identically denoted and their names and functions are also identical.

First Embodiment

The present invention in a first embodiment provides an abnormality detection system, as will be described hereinafter.

Figure 1:
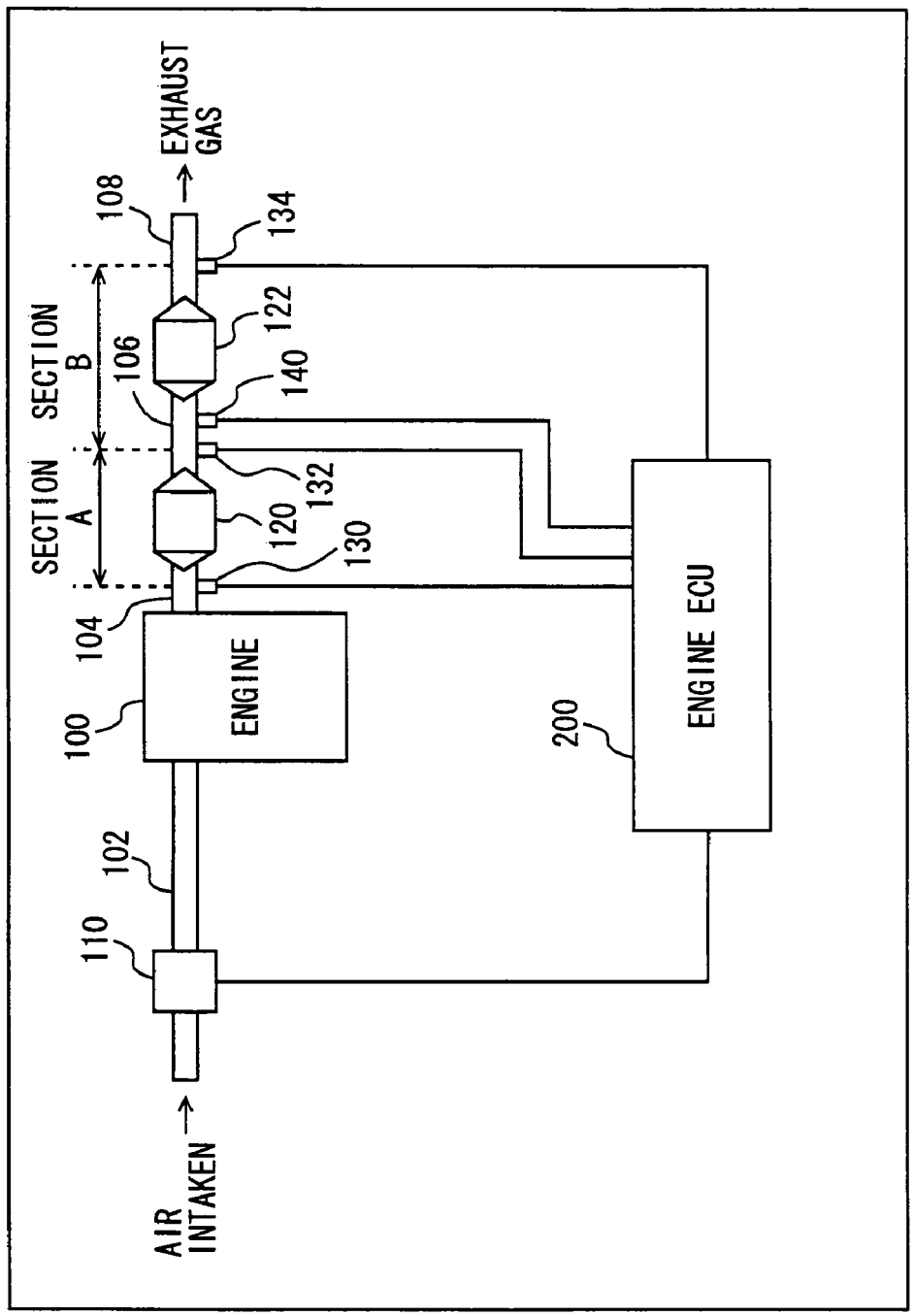
FIG. 1 is a general, control block diagram of an abnormality detection system in accordance with a first embodiment of the present invention.

FIG. 1 is a general, control block diagram of the abnormality detection system. As shown in FIG. 1, the abnormality detection system detects abnormality occurring in an internal combustion engine 110 at exhaust pipes 104, 106, 108. The abnormality detection system includes: engine 100; an air intake pipe 102 sending air into engine 100; exhaust pipe 104, 106, 108 exhausting gas from engine 100; an airflowmeter 110 arranged at air intake pipe 102, a first catalyst 120 arranged between exhaust pipes 104 and 106; a second catalyst 122 arranged between exhaust gas 106 and exhaust pipe 108; an air fuel ratio sensor 130 arranged upstream of the first catalyst 120 (or closer to engine 100); a second air fuel ratio sensor 132 arranged between the first and second catalysts 120 and 122; a third air fuel ratio sensor 134 arranged downstream of the second catalyst 122; and an oxygen sensor 140 arranged between the first and second catalysts 120 and 122.

Airflowmeter 110, the first, second and third air fuel ratio sensors 130, 132 and 134, and oxygen sensor 140 are connected to an engine electronic control unit (ECU) 200 controlling the abnormality detection system. Furthermore, as shown in FIG. 1, the first and second air fuel ratio sensors 130 and 132 sandwiches a section, which will be referred to as a section A, and the second and third air fuel ratio sensors 132 and 134 sandwiches a section, which will be referred to as a section B.

Engine 100 is supplied with an amount of air adjusted as engine ECU 200 controls an electronic throttle valve as based for example on a gas pedal's opening. Engine ECU 200 determines an amount of fuel injection that allows a theoretical air fuel ratio in engine 100 when an amount of air adjusted by the electronic throttle valve is intaken by engine 100.

Air fuel ratio sensors 130, 132, 134 detect oxygen concentration of exhaust gas in exhaust pipes 104, 106, 108 and from the oxygen concentration calculate an air fuel ratio and output the resultant calculation to engine ECU 200 by a voltage value, a current value or the like. Oxygen sensor 140 detects oxygen concentration in exhaust gas in exhaust pipe 106 and outputs either an inverse rich signal or lean signal to engine ECU 200.

The first and second catalysts 120 and 122 are both catalysts referred to as 3-way catalyst and clean exhaust gas discharged from engine 100.

Figure 2:
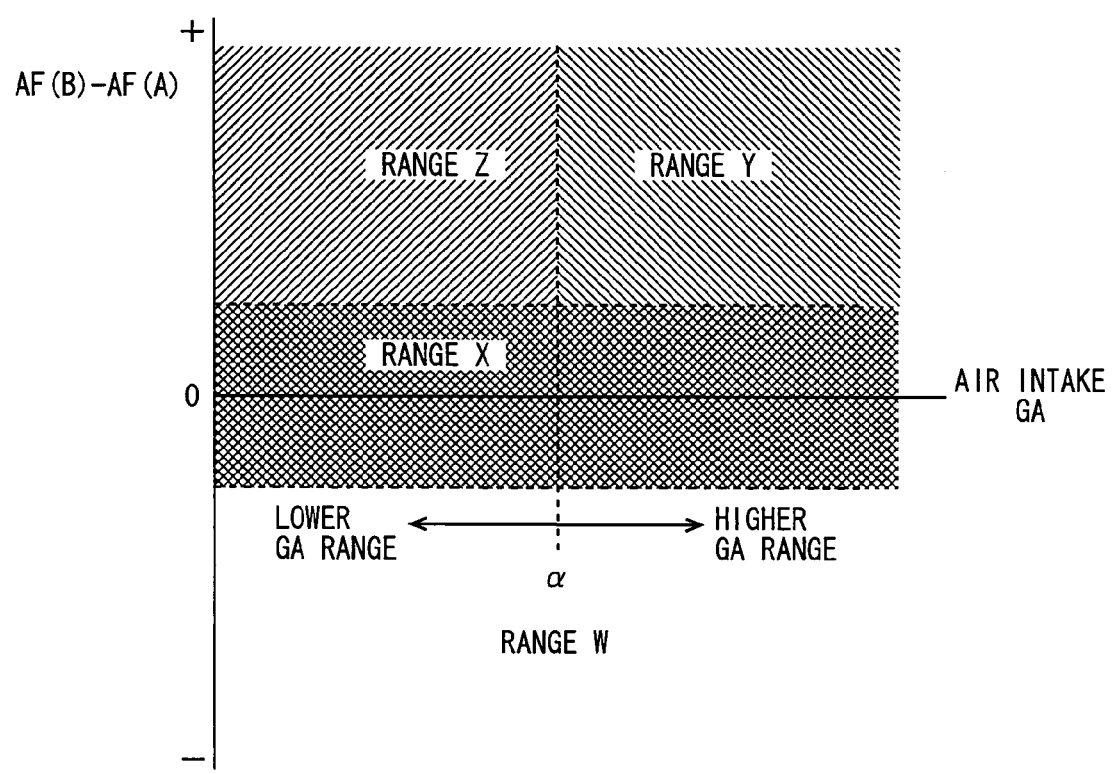
FIG. 2 shows a map stored in the FIG. 1 engine ECU.

Reference will now be made to FIG. 2 to describe a map stored in a memory of engine ECU 200 shown in FIG. 1. As shown in FIG. 2, the map has a horizontal axis representing air intake GA and a vertical axis representing an air fuel ratio AF(B) detected by the second air fuel ratio sensor 132 minus an air fuel ratio AF(A) detected by the first air fuel ratio sensor 130.

As shown in FIG. 2, air intake GA smaller than a predetermined threshold value α and that equal to or larger than threshold value α are defined as lower and higher GA ranges, respectively. In the lower GA range a range high in {AF(B)–AF(A)} is defined as a range Z and in the higher GA range a range high in {AF(B)–AF(A)} is defined as a range Y. Furthermore in both lower and higher GA ranges a range with {AF(B)–AF(A)} smaller than a predetermined positive value and larger than a predetermined negative value is defined as a range X. Furthermore, a range other than ranges X, Y and Z is defined as a range W. Range W is not subject to making a decision for example whether an exhaust pipe has a leak, an air fuel ratio sensor has abnormality, and the like, as described hereinafter.

Figure 3:
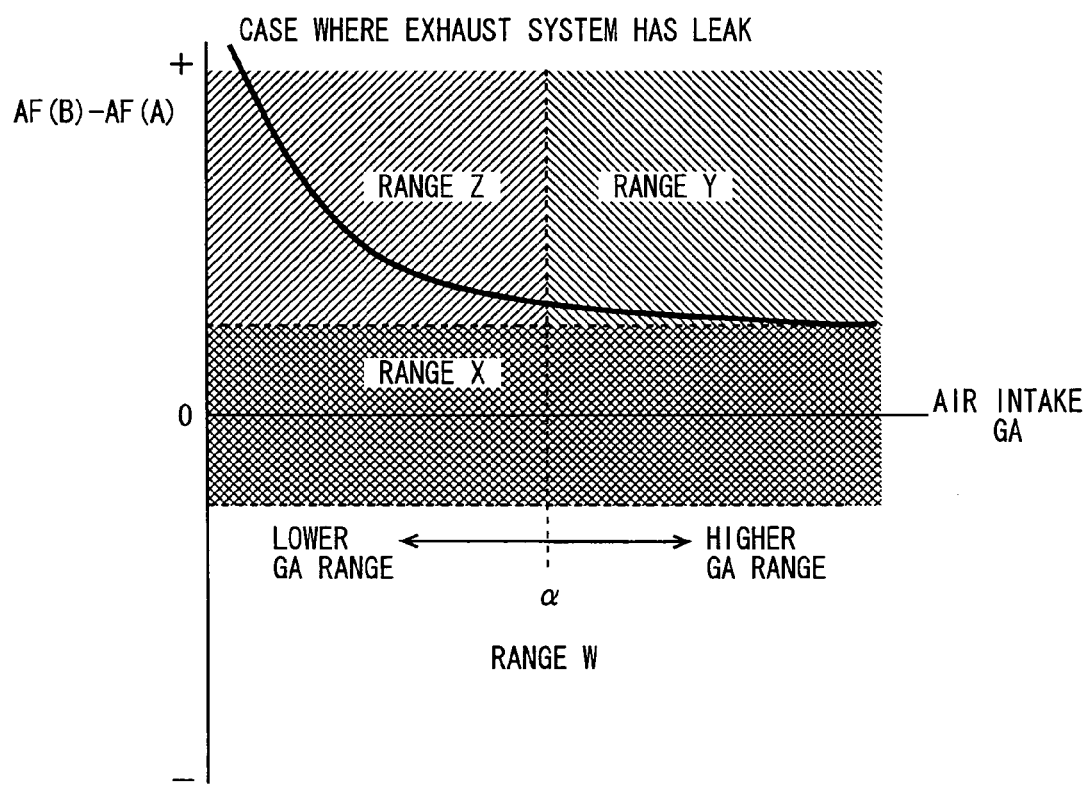
FIG. 3 represents a characteristic curve provided when the FIG. 2 map has an exhaust gas leak.

FIG. 3 illustrates that the section A exhaust pipe has a leak, shown as overlaid on the FIG. 2 map. As shown in FIG. 3, when the section A exhaust pipe has a leak there is provided a characteristic such that in the lower GA range a large {AF(B)–AF(A)} is provided and in the higher GA range a small {AF(B)–AF(A)} is provided. More specifically, air fuel ratio sensors 130, 132 detect an air fuel ratio of air by mass/fuel by mass, and the lower GA range corresponding to small air intake is associated with increased {AF(B)–AF(A)} and increased air intake is associated with a decreased value of {AF(B)–AF(A)} indicating the leak's effect. As shown in FIG. 3, range X indicates that section A does not have a leak.

FIG. 4 is a table used to determine for example whether section A has a leak, an air fuel ratio sensor has abnormality, and the like. The FIG. 4 table is stored in a memory of engine ECU 200. As shown in FIG. 4, for range X for both the lower and higher GA ranges, a decision is made that the section A exhaust pipe does not have a leak.

For ranges Z and X for the lower and higher GA ranges, respectively, a decision is made that there is a leak. This is because for the lower GA range engine 100 exhausts a small amount of gas and due to the gas's leak the exhaust pipe externally intakes an amount of air, which has a significant effect and {AF(B)−AF(A)} is increased in value and thus falls within range Z. When there is a leak, for the higher GA range the leak's effect varies as air intake increases, and {AF(B)−AF(A)} gradually decreases. Thus in the higher GA range it falls within range X.

Furthermore, as shown in FIG. 4, for ranges X and Y for the lower and higher GA ranges, respectively, or for ranges Z and Y for the lower and higher GA ranges, respectively, a decision is made that either the first or second air fuel ratio sensor 130 or 132 or both of them has/have abnormality.

For {AF(B)−AF(A)} falling within range X for the lower GA range and transitioning to range Y for the higher GA range, it can be conjectured from range X for the lower GA range that the section A exhaust pipe does not have a leak, and its effect should not be present in the higher GA range. In reality, however, {AF(B)−AF(A)} has a large value, which is contradictory.

For {AF(B)−AF(A)} falling within range Z for the lower GA range and transitioning into range Y for the higher GA range, it can be conjectured that there is a leak for the lower GA range and for the higher GA range the leak's effect decreases and {AF(B)−AF(A)} should falls within range X. In reality, however, it falls within range Y, a range corresponding to large {AF(B)−AF(A)}, and a decision is thus made that the sensor or sensors has or have abnormality.

FIG. 5 is a table employed to determine for example whether the section B exhaust pipe has a leak and the section's air fuel ratio sensor has abnormality. While in the following description a method of decision for section A will be described, the FIG. 5 table for decision for section B allows the section B exhaust pipe's leak, air fuel ratio sensor's abnormality and the like to be similarly detected.

Figure 6:
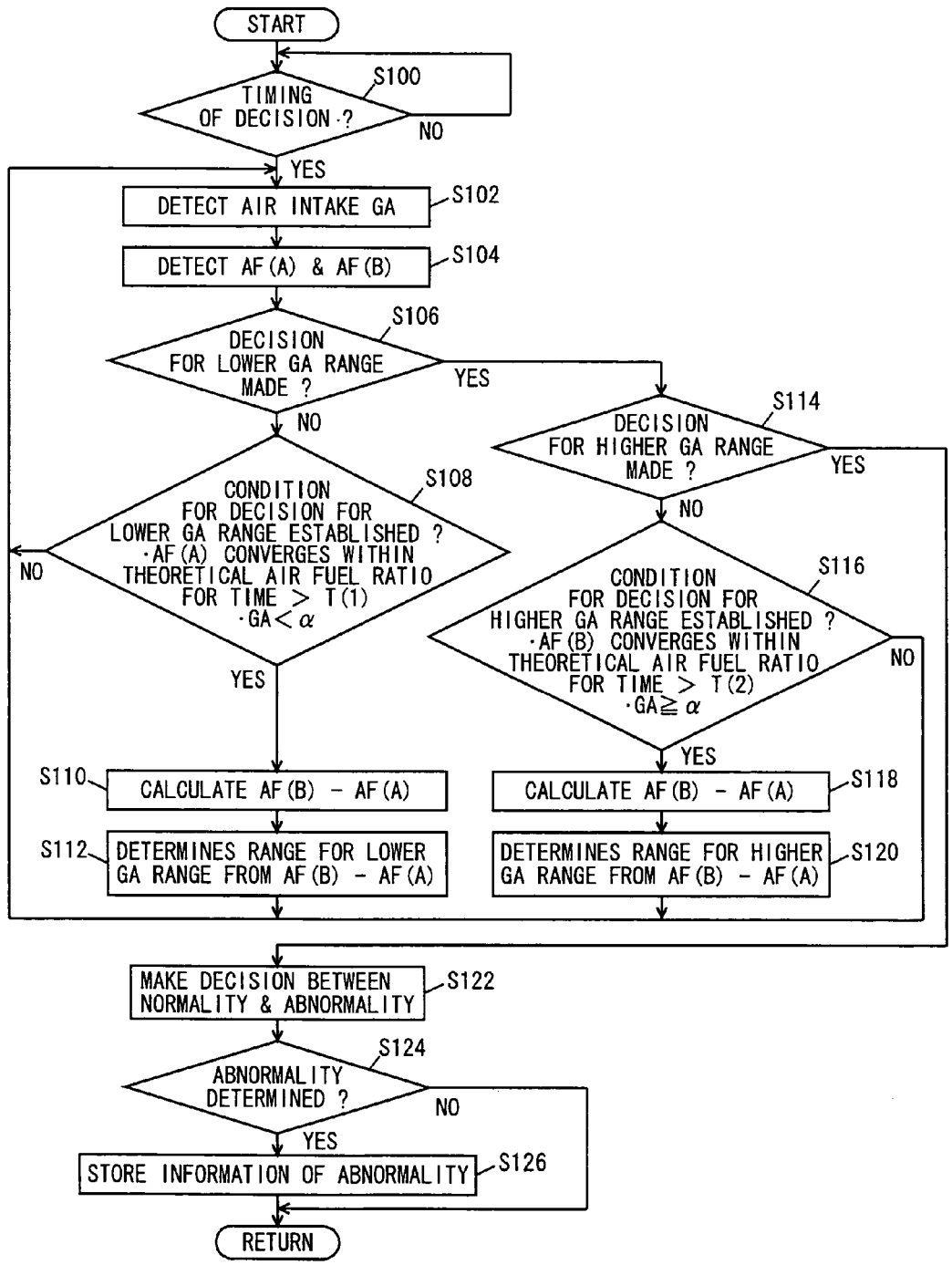
FIG. 6 is a flowchart illustrating a control structure of a program run by the engine ECU of the abnormality detection system in accordance with the first embodiment of the present invention.

Reference will now be made to FIG. 6 to describe a control configuration of a program run by engine ECU 200 of the abnormality detection system in the present embodiment.

At step (S) 100 engine ECU 200 determines whether a timing of decision is reached. This timing of decision is set for example for each predetermined time. When the timing is reached (YES at S100) the process moves on to S102. Otherwise (NO at S100) the process returns to S100 and waits until the timing of decision is reached.

At S102 engine ECU 200 detects air intake GA. More specifically, engine ECU 200 detects air intake GA from a signal received from airflowmeter 110.

At S104 engine ECU 200 detects the first and second air fuel ratios AF(A) and AF(B) from signals received from the first and second air fuel ratio sensors 130 and 132, respectively.

At S106 engine ECU 200 determines whether a decision has been made for the lower GA range. If so (YES and S106) the process moves on to S114. Otherwise (NO at S106) the process moves on to S108.

At S108 engine ECU 200 determines whether a condition for decision for the lower GA range has been established. More specifically, engine ECU 200 determines whether the first air fuel ratio AF(A) detected by the first air fuel ratio sensor 130 converges within a theoretical air fuel ratio for a time longer than a predetermined time T(1). Furthermore engine ECU 200 determines whether air intake GA detected by airflowmeter 110 is smaller than the predetermined threshold value α. If these two conditions have been established, engine ECU 200 determines that the condition for decision for the lower GA range has been established (YES at S108) and the process moves on to S110. Otherwise (NO at S108) the process returns to S102.

At S110 engine ECU 200 subtracts the first air fuel ratio AF(A) detected by the first air fuel ratio sensor 130 from the second air fuel ratio AF(B) detected by the second air fuel ratio sensor 132 to calculate {AF(B)−AF(A)}. At S112 engine ECU 200 uses {AF(B)−AF(A)} to determine a range for the lower GA range. In doing so, the FIG. 2 map is used. As the decision is made for the lower GA range, a decision is made whether {AF(B)−AF(A)} falls within either the FIG. 2 range X or range Z. After S112 completes, the process returns to S102.

At S114 engine ECU 200 determines whether a decision has been made for the higher GA range. If so (YES at S114) the process moves on to S112. Otherwise (NO at S14) the process moves on to S116.

At 116 engine ECU 200 determines whether a condition for decision for the higher GA range has been established. More specifically, engine ECU 200 determines whether the second air fuel ratio AF(B) detected by the second air fuel ratio sensor 132 converges within a theoretical air fuel ratio for a time longer than a predetermined time T(2). Furthermore engine ECU 200 determines whether air intake GA detected by airflowmeter 110 is equal to or more than the predetermined threshold value α. If these two conditions have been established, engine ECU 200 determines that the condition for decision for the higher GA range has been established (YES at S116) and the process moves on to S118. Otherwise (NO at S116) the process returns to S102.

At S118 engine ECU 200 subtracts the first air fuel ratio AF(A) detected by the first air fuel ratio sensor 130 from the second air fuel ratio AF(B) detected by the second air fuel ratio sensor 132 to calculate {AF(B)−AF(A)}. At S120 engine ECU 200 uses {AF(B)−AF(A)} to determine a range for the higher GA range. In doing so, the FIG. 2 map is used. As the decision is made for the higher GA range, a decision is made whether {AF(B)−AF(A)} falls within either the FIG. 2 range X or range Y. After S120 completes, the process returns to S102.

At S112, engine ECU 200 makes a decision between normality and abnormality. In doing so, the FIG. 4 table is used. More specifically, a decision for section A is made from whether {AF(B)−AF(A)} falls for the lower GA range within range X, Y or Z and whether it falls for the higher GA range within range X, Y or Z. At S124 engine ECU 200 determines whether abnormality is determined. Except for the "NO LEAK" indicated in FIG. 4, the engine determines that abnormality is determined (YES at S124) and the process moves on to S126. Otherwise (NO at S124) This process ends.

At S126 engine ECU 200 stores information of abnormality to memory. The stored information of abnormality is used for example as a diagnosis or information employed to display an alarm light provided to a dashboard.

In accordance with the above described configuration and flowchart the present embodiment's abnormality detection system operates as will be described hereinafter.

When a timing of decision has arrived (YES at 100) engine ECU 200 detects an air intake detected by airflowmeter 110 (S102). Engine ECU 200 detects the first air fuel ratio AF(A) detected by the first air fuel ratio sensor 130 arranged upstream of section A and air fuel ratio AF(B) detected by the second air fuel ratio sensor 132 arranged downstream of section A (S104).

If a decision has not been made for the lower GA range (NO at S106) and the condition for decision for the lower GA range has been established (YES at S108) air fuel ratio AF(B) detected by the second air fuel ratio sensor 132 minus air fuel ratio AF(A) detected by the first air fuel ratio sensor 130 is calculated (S110). The resultant calculation and the FIG. 2 map are used to determine a range (i.e., range X or Z) for the lower GA range (S112).

If the condition for decision for the lower GA range has not been established (NO at S108) or the two conditions that air fuel ratio AF(A) detected by the first air fuel ratio sensor 130 converges within a theoretical air fuel ratio for a time longer than the predetermined time T(1) and that air intake GA is smaller than the predetermined threshold value α are not satisfied then again air intake GA is detected (S102) and air fuel ratios AF(A) and AF(B) are detected (S104).

If a decision has been made for the lower GA range (YES at 106) then a decision is made whether a decision has been made for the higher GA range (S114). If not (NO at S114) then a decision is made whether a condition for decision for the higher GA range has been established (S116). If so (YES at S116) air fuel ratio AF(B) detected by the second air fuel ratio sensor 132 minus air fuel ratio AF(A) detected by the first air fuel ratio sensor 130 is calculated (S118). The resultant calculation and the FIG. 2 map are used to determine a range (i.e., range X or Y) for the higher GA range (S120).

Note that making a decision for the higher GA range also involves determining whether a condition for decision for the higher GA range has been established as well as determining whether that for decision for the lower GA range has been established. More specifically, if air fuel ratio AF(B) detected by the second air fuel ratio sensor 132 converges within a theoretical air fuel ratio for a time longer than the predetermined time T(2) and air intake GA is not equal to or larger than the predetermined threshold value α (NO at S116) again air intake GA is detected (S102) and air fuel ratios AF(A) and AF(B) are detected (S104).

If a decision for the lower GA range has been made (YES at S106) and that for the higher GA range has also been made (YES at S114) then a decision is made between normality and abnormality (S122). Prior thereto, the lower GA range has been subjected to a decision between ranges (X and Z) and the higher GA range has been subjected to a decision between ranges (X and Y). These decisions and the FIG. 4 table are used to make a decision for section A between normality and abnormality (S122).

For both the lower and higher GA a range other than range X is determined as indicating abnormality (S124). As the information of the abnormality, the information that the section A exhaust pipe has a leak or that the first or second air fuel ratio sensor 130 or 132 has abnormality is stored to memory (126).

Thus in the present embodiment's abnormality detection system if for a low air intake GA range air fuel ratio AF(A) converges within a theoretical air fuel ratio for a long period of time a downstream air fuel ratio minus an upstream air fuel ratio is calculated and then used to determine a range for the low GA range. If for a high air intake GA range air fuel ratio AF(B) converges within a theoretical air fuel ratio for a long period of time a downstream air fuel ratio minus an upstream air fuel ratio is calculated and then used to determine a range for the high GA range. From the range (X or Z) determined for the lower GA range and the range (X or Y) determined for the higher GA range a decision is made for section A between normality and abnormality. Thus air intake can be considered and a value detected by an air fuel ratio sensor can exactly be used to detect abnormality of an exhaust pipe with high precision.

Note that the FIG. 6 flowchart may have AF(A) and AF(B) modified to AF(B) and AF(C), respectively, so that the FIG. 5 table can be used to determine abnormality in section B.

Second Embodiment

The present invention in a second embodiment provides an abnormality detection system as will be described hereinafter. Note that the present embodiment's abnormality detection system has the same hardware configuration as that of the abnormality detection system described in the first embodiment (as shown in FIG. 1).

Reference will now be made to FIG. 7 to describe a table stored in an engine ECU 200 of the abnormality detection system of the present embodiment. As shown in FIG. 7, the present embodiment provides engine ECU 200 detecting normality/abnormality of the first, second and third air fuel ratio sensors 130, 132, 134 arranged at an exhaust pipe. Accordingly a decision is made on a relationship in magnitude between an absolute value of a difference between air fuel ratios detected by the three air fuel ratio sensors and predetermined threshold values β, γ, σ.

As indicated in FIG. 7, the first, second and third air fuel ratio sensors 130, 132 and 134 detect air fuel ratios AF(A), AF(B) and AF(C), respectively.

If $|AF(A)-AF(B)| \leq \beta$, $|AF(A)-AF(C)| \leq \sigma$, and $|AF(B)-AF(C)| \leq \sigma$ are established, a decision is made that the first, second and third air fuel ratio sensors 130, 132 and 134 all operate normally.

If of the three expressions $|AF(A)-AF(B)| \leq \beta$, $|AF(A)-AF(C)| \leq \gamma$ and $|AF(B)-AF(C)| \leq \sigma$, only $|AF(B)-AF(C)| \leq \sigma$ is established then a decision is made that only the first air fuel ratio sensor 130 has abnormality.

If of the three expressions $|AF(A)-AF(B)| \leq \beta$, $|AF(A)-AF(C)| \leq \gamma$ and $|AF(B)-AF(C)| \leq \sigma$, only $|AF(A)-AF(C)| \leq \gamma$ is established then a decision is made that only the second air fuel ratio sensor 132 has abnormality.

If of the three expressions $|AF(A)-AF(B)| \leq \beta$, $|AF(A)-AF(C)| \leq \gamma$ and $|AF(B)-AF(C)| \leq \sigma$, only $|AF(A)-AF(B)| \leq \beta$ is established then a decision is made that only the third air fuel ratio sensor 134 has abnormality.

Figure 8:
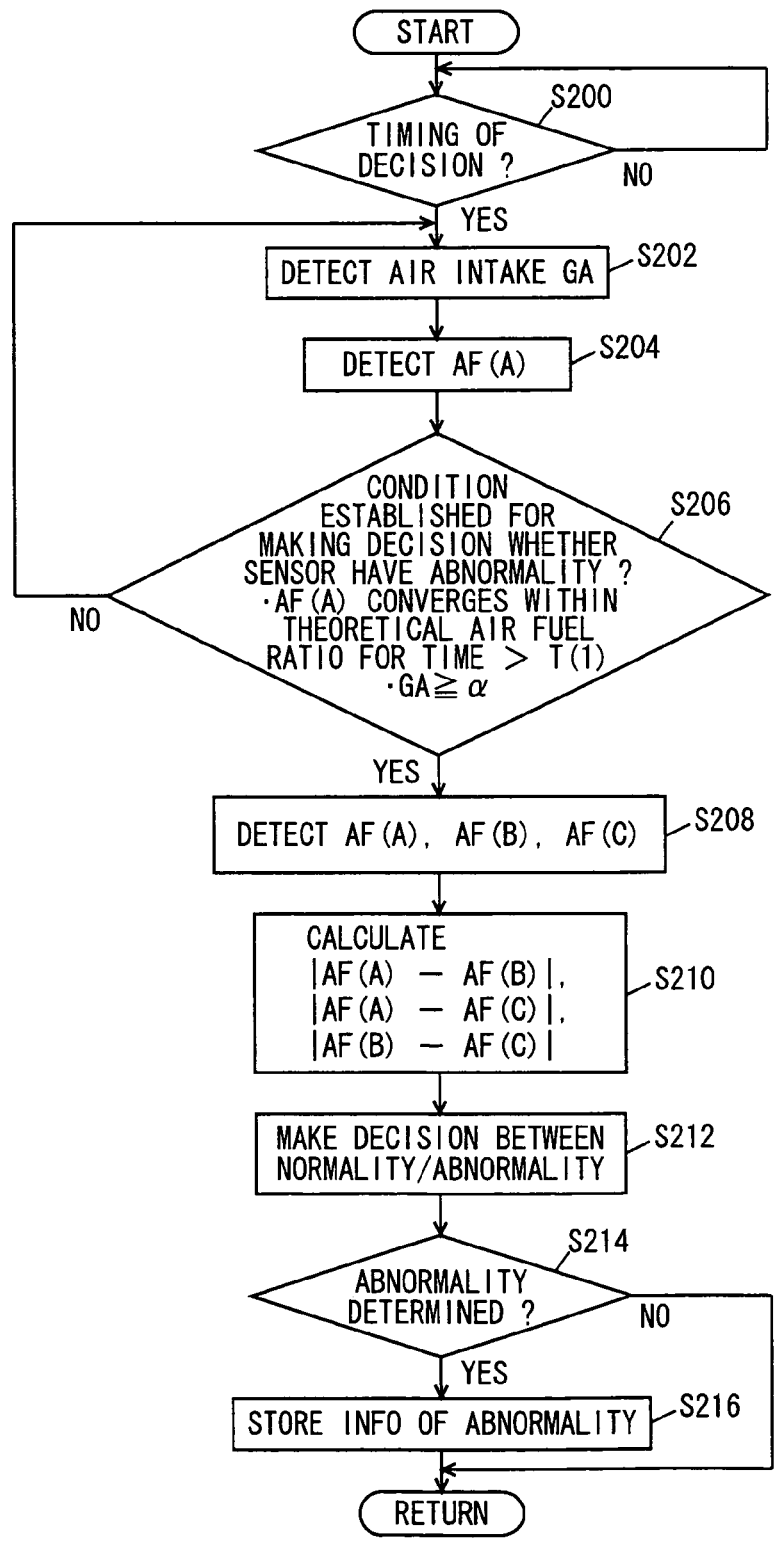
FIG. 8 is a flowchart illustrating a control structure of a program run by the engine ECU of the abnormality detection system in accordance with the second embodiment of the present invention.

Reference will now be made to FIG. 8 to describe a control configuration of a program run by engine ECU 200 of the abnormality detection system of the present embodiment.

At S200 engine ECU 200 determines whether it is a timing of decision. If so (YES at S200) then the process moves on to S202. Otherwise (NO at S200) the process returns to S200 and the timing of decision is awaited.

At S202 engine ECU 200 detects air intake GA from a signal received from airflowmeter 110. At S204 engine ECU 200 detects the first air fuel ratio AF(A) from a signal received from the first air fuel ration sensor 130.

At S206 engine ECU 200 determines whether a condition has been established for determining whether the sensors have abnormality. More specifically, if the first air fuel ratio AF(A) converges within a theoretically air fuel ratio for a time larger than the predetermined time T(1) and air intake GA is equal to or more than the predetermined threshold value α, engine ECU 200 determines that the condition has been established (YES at S206) and the process moves on to S208. Otherwise (NO at S206) the process returns to S202.

At S208 engine ECU 200 detects the first, second and third air fuel ratios AF(A), AF(B) and AF(C) from signals received from the first, second and third air fuel ratio sensors 130, 132 and 134, respectively. At S211 engine ECU 200 calculates |AF(A)−AF(B)|, |AF(A)−AF(C)| and |AF(B)−AF(C)|.

At S212 engine ECU 200 makes a decision whether the air fuel ratio sensors operate normally or have abnormality. In doing so, the FIG. 7 table is used. At S214 engine ECU 200 determines whether abnormality has been determined. As shown in FIG. 7, only if the three expressions are all established a decision is made that the sensors operate normally. Otherwise a decision is made that there is abnormality (YES at S214) and the process moves on to S216. Otherwise (NO at S214) the process ends.

At S216 engine ECU 200 stores the information of the abnormality (the abnormality of air fuel ratio sensor).

In accordance with the above described configuration and flowchart the present embodiment's abnormality detection system operates as will be described hereinafter.

When a timing of decision has arrived (YES at S200) air intake GA is detected from a signal detected by airflowmeter 110(S202). The first air fuel ratio AF(A) detected by the first air fuel ratio sensor 130 is detected (S204) and if the first air fuel ratio AF(A) converges within a theoretical air fuel ratio for a time larger than the predetermined time T(1) and air intake GA is also equal to or larger than the predetermined threshold value α a decision is made that a condition is established for making a decision on whether the sensors have abnormality (YES at S206).

From signals received from the first, second and third air fuel ratio sensors 130, 132 and 134 the first, second and third air fuel ratios AF(A), AF(B), and AF(C) are detected, respectively (S208). Two of the three sensors are selected and combined together and their difference's absolute value is calculated (S210).

The calculated air fuel ratio difference's absolute value and the FIG. 7 table are used to determine whether the air fuel ratio sensors operate normally or have abnormality (S212). If a decision is made that there is abnormality (YES at S214), information of the abnormality is stored to a memory of engine ECU 200 (S216).

Thus in the present embodiment's abnormality detection system an exhaust pipe is provided with three air fuel ratio sensors and if they detect stable values and there is also a large air intake two of the three sensors can be selected and combined together to form three pairs of sensors and their air fuel ratio differences in absolute value can be used to determine whether the sensors operate normally or have abnormality.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for detecting an abnormality of an internal combustion engine, comprising:

first air fuel ratio detection means arranged at an exhaust pipe of said internal combustion engine closer to said internal combustion engine for detecting an air fuel ratio of exhaust gas;

second air fuel ratio detection means arranged at said exhaust pipe downstream of said first air fuel ratio detection means for detecting an air fuel ratio of exhaust gas;

detection means for detecting an air intake introduced into said internal combustion engine;

calculation means for calculating a difference between a value detected by said first air fuel ratio detection means and that detected by said second air fuel ratio detection means; and abnormality detection means using said air intake and said difference for detecting the abnormality of the internal combustion engine at said exhaust pipe located between said first and second air fuel ratio detection means.

2. The apparatus of claim 1, wherein said abnormality detection means includes means for detecting a leak from said exhaust pipe located between said first and second air fuel ratio detection means.

3. The apparatus of claim 2, wherein said calculation means includes means for subtracting said value detected by said first air fuel ratio detection means from that detected by said second air fuel ratio detection means to calculate said difference.

4. The apparatus of claim 3, wherein said abnormality detection means includes:

means detecting that said exhaust pipe has a leak when for a range of said air intake having at most a predetermined amount of air said difference has a positive value larger than a predetermined value and for a range of said air intake having an amount larger than said predetermined amount of air said difference has at most said predetermined value; and means for detecting that said exhaust pipe does not have a leak when for said range of said air intake having at most said predetermined amount of air said difference has at most said predetermined value and for said range of said air intake having an amount larger than said predetermined amount of air said difference has at most said predetermined value.

5. The apparatus of claim 1, wherein a catalyst device is arranged at said exhaust pipe between said air fuel ratio detection means.

6. An apparatus detecting abnormality of an internal combustion engine, comprising:

first air fuel ratio detection means arranged at an exhaust pipe of said internal combustion engine closer to said internal combustion engine for detecting an air fuel ratio of exhaust gas;

second air fuel ratio detection means arranged at said exhaust pipe downstream of said first air fuel ratio detection means for detecting an air fuel ratio of exhaust gas;

detection means for detecting an air intake introduced into said internal combustion engine;

calculation means for calculating a difference between a value detected by said first air fuel ratio detection means and that detected by said second air fuel ratio detection means; and abnormality detection means using said air intake and said difference for detecting abnormality of one of said first and second air fuel ratio detection means.

7. The apparatus of claim 6, wherein said calculation means includes means for subtracting said value detected by said first air fuel ratio detection means from that detected by said second air fuel ratio detection means to calculate said difference.

8. The apparatus of claim 7, wherein said abnormality detection means includes means for detecting abnormality of one of said first and second air fuel ratio detection means when for a range of said air intake having at most a predetermined amount of air said difference has at most a predetermined value and for a range of said air intake having an amount larger than said predetermined amount of air said difference has a positive value larger than said predetermined value or when for said range of said air intake having at most said predetermined amount of air said difference has a positive value larger than said predetermined value and for said range of said air intake having an amount larger than said predetermined amount of air said difference has a positive value larger than said predetermined value.

9. The apparatus of claim 6, wherein a catalyst device is arranged at said exhaust pipe between said air fuel ratio detection means.

10. The apparatus of claim 6, wherein
third air fuel ratio detection means arranged at said exhaust pipe downstream of said second air fuel ratio detection means for detecting an air fuel ratio of exhaust gas;
calculation means for calculating a difference between values detected by said air fuel ratio detection means; and
abnormality detection means using said difference and a predetermined threshold value for detecting abnormality of said air fuel ratio detection means.

11. The apparatus of claim 10, wherein:
said calculation means includes means for calculating a first value corresponding to an absolute value of a difference between values detected by said first and second air fuel ratio detection means, a second value corresponding to an absolute value of a difference between values detected by said first and third air fuel ratio detection means, and a third value corresponding to an absolute value of a difference between values detected by said second and third air fuel ratio detection means; and
said abnormality detection means includes means for detecting abnormality of said air fuel ratio detection means from a comparison between said first value and a first threshold value, a comparison between said second value and a second threshold value and a comparison between said third value and a third threshold value.

12. The apparatus of claim 10, wherein a catalyst device is arranged at said exhaust pipe between said air fuel ratio detection means.

13. An apparatus for detecting an abnormality of an internal combustion engine, comprising:
a first air fuel ratio detector arranged at an exhaust pipe of said internal combustion engine closer to said internal combustion engine to detect an air fuel ratio of exhaust gas;
a second air fuel ratio detector arranged at said exhaust pipe downstream of said first air fuel ratio detector to detect an air fuel ratio of exhaust gas;
a detector detecting an air intake introduced into said internal combustion engine;
a calculator calculating a difference between a value detected by said first air fuel ratio detector and that detected by said second air fuel ratio detector; and
an abnormality detector using said air intake and said difference to detect the abnormality of the internal combustion engine at said exhaust pipe located between said first and second air fuel ratio detectors.

14. The apparatus of claim 13, wherein said abnormality detector detects a leak from said exhaust pipe located between said first and second air fuel ratio detectors.

15. The apparatus of claim 14, wherein said calculator subtracts said value detected by said first air fuel ratio detector from that detected by said second air fuel ratio detector to calculate said difference.

16. The apparatus of claim 15, wherein:
said abnormality detector detects that said exhaust pipe has a leak when for a range of said air intake having at most a predetermined amount of air said difference has a positive value larger than a predetermined value and for a range of said air intake having an amount larger than said predetermined amount of air said difference has at most said predetermined value; and
said abnormality detector detects that said exhaust pipe does not have a leak when for said range of said air intake having at most said predetermined amount of air said difference has at most said predetermined value and for said range of said air intake having an amount larger than said predetermined amount of air said difference has at most said predetermined value.

17. The apparatus of claim 13, wherein a catalyst device is arranged at said exhaust pipe between said air fuel ratio detectors.

18. An apparatus detecting abnormality of an internal combustion engine, comprising:
a first air fuel ratio detector arranged at an exhaust pipe of said internal combustion engine closer to said internal combustion engine to detect an air fuel ratio of exhaust gas;
a second air fuel ratio detector arranged at said exhaust pipe downstream of said first air fuel ratio detector to detect an air fuel ratio of exhaust gas;
a detector detecting an air intake introduced into said internal combustion engine;
a calculator calculating a difference between a value detected by said first air fuel ratio detector and that detected by said second air fuel ratio detector; and
an abnormality detector using said air intake and said difference to detect abnormality of one of said first and second air fuel ratio detectors.

19. The apparatus of claim 18, wherein said calculator subtracts said value detected by said first air fuel ratio detector from that detected by said second air fuel ratio detector to calculate said difference.

20. The apparatus of claim 19, wherein said abnormality detector detects abnormality of one of said first and second air fuel ratio detectors when for a range of said air intake having at most a predetermined amount of air said difference has at most a predetermined value and for a range of said air intake having an amount larger than said predetermined amount of air said difference has a positive value larger than said predetermined value or when for said range of said air intake having at most said predetermined amount of air said difference has a positive value larger than said predetermined value and for said range of said air intake having an amount larger than said predetermined amount of air said difference has a positive value larger than said predetermined value.

21. The apparatus of claim 18, wherein a catalyst device is arranged at said exhaust pipe between said air fuel ratio detectors.

22. The apparatus of claim 18, wherein
a third air fuel ratio detector arranged at said exhaust pipe downstream of said second air fuel ratio detector to detect an air fuel ratio of exhaust gas;
a calculator calculating a difference between values detected by said air fuel ratio detectors; and
an abnormality detector using said difference and a predetermined threshold value to detect abnormality of said air fuel ratio detectors.

23. The apparatus of claim 22, wherein:
said calculator calculates a first value corresponding to an absolute value of a difference between values detected by said first and second air fuel ratio detectors, a second value corresponding to an absolute value of a difference between values detected by said first and third air fuel ratio detectors, and a third value corresponding to an absolute value of a difference between values detected by said second and third air fuel ratio detectors; and
said abnormality detector detects abnormality of said air fuel ratio detectors from a comparison between said first value and a first threshold value, a comparison between said second value and a second threshold value and a comparison between said third value and a third threshold value.

24. The apparatus of claim 22, wherein a catalyst device is arranged at said exhaust pipe between said air fuel ratio detectors.

\* \* \* \* \*